Nov. 12, 1946.　　　F. SLUSHER　　　2,410,905
APPARATUS FOR SLITTING ENDLESS BANDS
Filed July 30, 1945　　　3 Sheets-Sheet 2

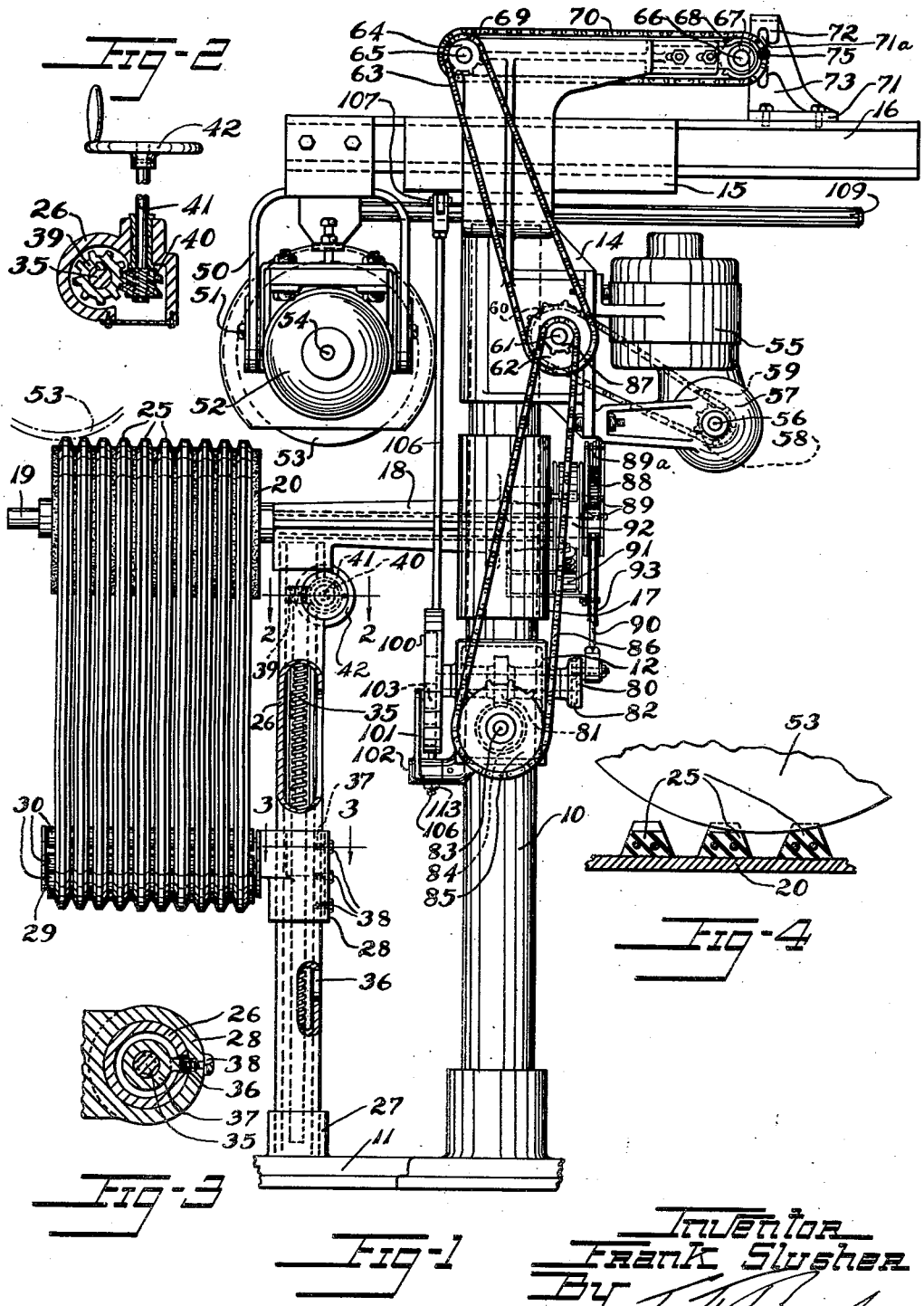

Inventor
Frank Slusher
By
Atty.

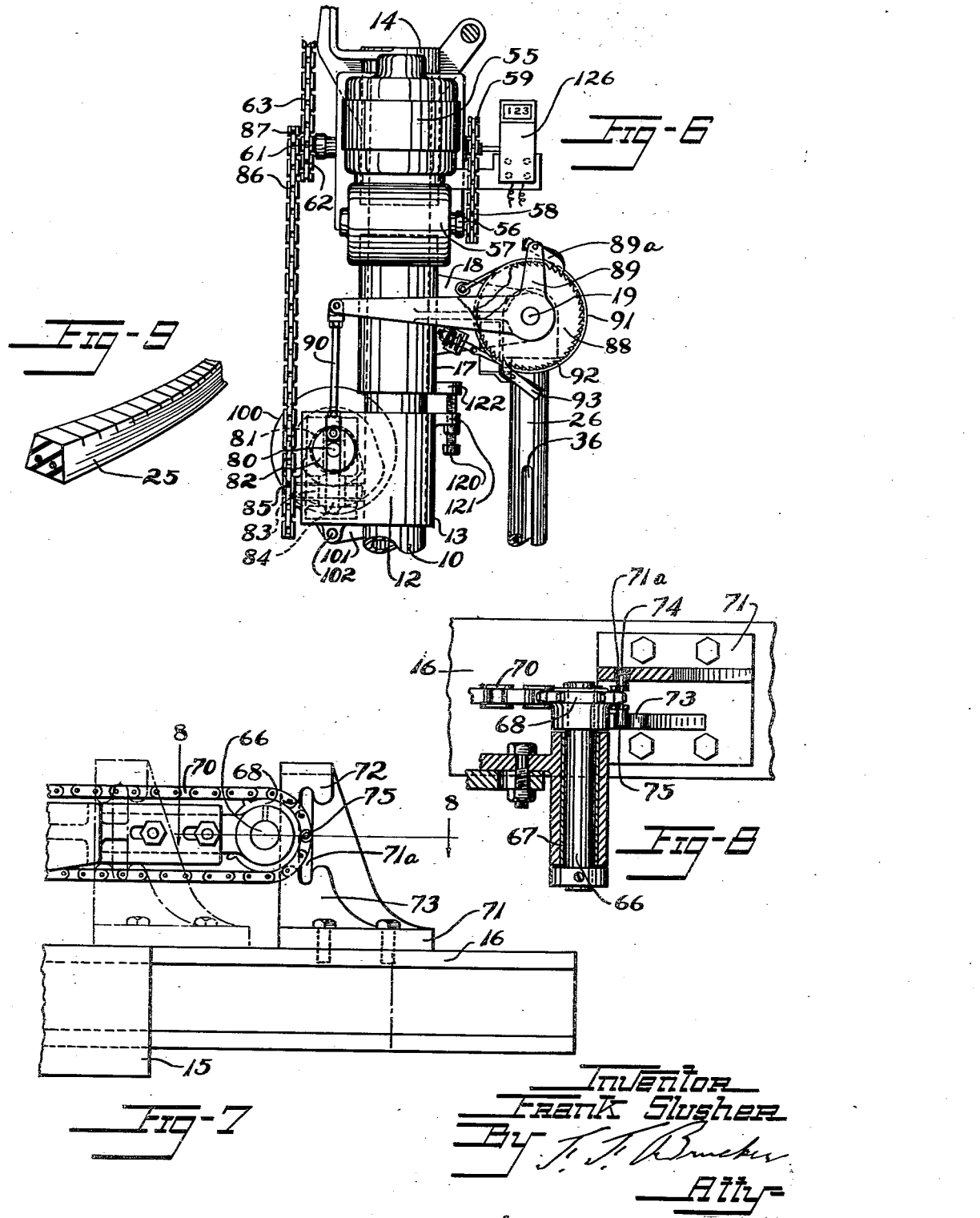

Patented Nov. 12, 1946

2,410,905

UNITED STATES PATENT OFFICE 2,410,905

APPARATUS FOR SLITTING ENDLESS BANDS

Frank Slusher, Akron, Ohio, assignor to The B. F. Goodrich Company, New York, N. Y., a corporation of New York Application July 30, 1945, Serial No. 607,801

4 Claims. (Cl. 164—76)

This invention relates to apparatus for laterally slitting endless bands of flexible material and is especially useful in the manufacture of transmission belts or the like.

In the manufacture of endless transmission belts of considerable thickness, and especially belts of trapezoidal cross-section commonly known as V-belts, it has been found that greater flexibility and longer life of the belt with a reduction of internal friction is provided by slitting the belts laterally at regular intervals across the inner face of the belt, the slits extending through the compression zone of the belt and terminating short of the tension zone thereof which contains the reinforcing material. The provision of such lateral slits has heretofore been accomplished with difficulty and the present invention provides apparatus for automatically and simultaneously slitting a multiplicity of belts with a minimum amount of attention of the operator.

Objects of the invention are to provide power-operated and controlled cutting of the slits in a belt; to provide uniform spacing of the slits; to provide simultaneous slitting of a multiplicity of belts in a single operation; to provide adjustability of the apparatus for belts of different lengths; to provide adjustability of depth of cut, and to provide efficiency of operation and uniformity of product.

These and other objects will appear from the following description and the accompanying drawings, which illustrate apparatus constructed in accordance with and embodying the invention.

Of the drawings,

Fig. 1 is a side elevation of the apparatus, parts being broken away and parts shown in section to more clearly show the mechanism;

Fig. 2 is a detailed cross-section taken on line 2—2 of Fig. 1;

Fig. 3 is a detailed cross-section taken on line 3—3 of Fig. 1;

Fig. 4 is a detailed sectional view showing a portion of the belt-supporting drum with belts supported thereon and showing a portion of the cutter in relation to the drum and belts when performing the slitting operation, other parts being broken away;

Fig. 6 is a rear elevation of part of the apparatus, parts being broken away and parts shown in section;

Fig. 7 is a detailed view of the ram and its driving mechanism, parts being broken away;

Fig. 8 is a sectional view taken on line 8—8 of Fig. 7, parts being broken away; and Fig. 9 is a perspective view of a portion of a belt having the lateral slits cut therein.

Figure 5:
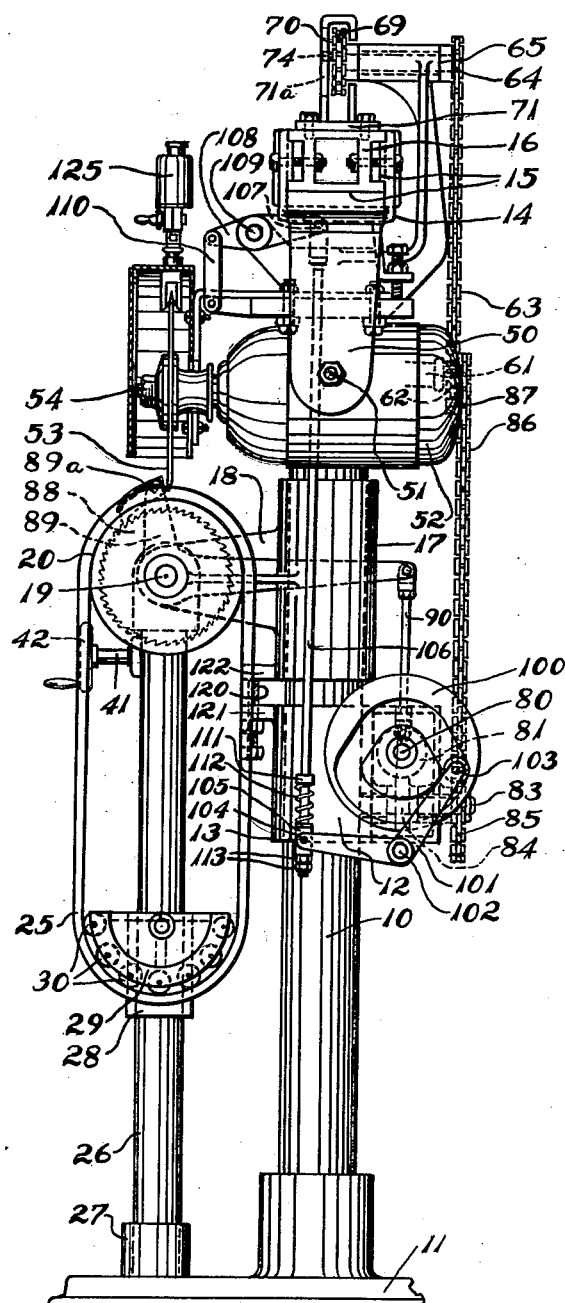
Fig. 5 is a front elevation of the apparatus, parts being broken away.

Referring to the drawings which show one embodiment of the invention, a column 10 is supported by a floor plate 11 and supports a bracket 12 having a collar portion 13 which surrounds the column and is secured thereto. A frame 14 is also fixed to column 10 at the upper end thereof and is formed with a horizontal trough-like guideway 15 in which a ram 16 is slidably mounted for horizontal endwise reciprocating movement. Slidably mounted upon the column 10 between the bracket 12 and the frame member 14 is a carriage having a collar portion 17 surrounding the column and a horizontal arm portion 18 having bearings for rotatably supporting a horizontal shaft 19. Fixed to the shaft 19 is a cylindrical drum 20 adapted to support upon its face a multiplicity of endless bands or belts 25.

For tensioning the belts about the upper face of the drum 20 a tubular column 26 is fixed at its upper end to the arm 18 and has its lower end slidably mounted in a collar 27 formed on the floor plate 11, the column 26 being parallel to the column 10. Slidably mounted on the column 26 is a collar 28 which supports a cradle frame 29 having a series of parallel idler rolls 30 for engaging the lower bight of the belts 25. An elevating screw 35 is journalled in suitable bearings within the column 26 concentric with its axis. A vertical slot 36 is provided in the wall of the column 26 and a threaded nut 37 engages the screw 35 within the column and extends through the slot where it is secured to the collar 28 by screws 38. A worm gear 39 is fixed to the upper end of the screw 35 and meshes with a worm 40 fixed to a shaft 41 journalled horizontally in the column 26 near its upper end. A hand wheel 42 is fixed to the shaft 41. The arrangement is such that by rotating the hand wheel 42, the nut 37, and with it the collar 28, cradle frame 29, and idler rolls 30, may be elevated to remove tension on the belts or lowered to tension the belts about the drum 20 and the cradle rolls. The face of the drum 20 is preferably knurled or otherwise roughened to prevent lateral displacement of the tensioned belts.

For slitting the belts, the ram 16, heretofore mentioned, is provided with a bracket 50 fixed to its forward extremity which pivotally supports, as at 51, an electric motor 52. A rotary cutter 53 is fixed to the shaft 54 of the motor for rotation thereby, the arrangement being such that upon endwise movement of the ram, the cutter is moved axially of the drum 20 across the belts tensioned thereon.

For reciprocating the ram 16, an electric motor 55 is fixed to frame member 14 and drives a horizontal shaft 56 through a speed reducer 57. A sprocket 58 on the shaft 56 drives a chain 59 which in turn drives a sprocket 60 fixed to a jack shaft 61 journalled in the frame member 14. A sprocket 62, also fixed to shaft 61, drives a chain 63 which drives the sprocket 64 on a horizontal shaft 65 above the ram 16, the shaft 65 being journalled in frame member 14. A shaft 66 parallel to shaft 65 is journalled in bearings 67 adjustably secured to the frame member 14. Shaft 66 carries a sprocket 68 fixed thereto, and a similar sprocket 69 is fixed to the shaft 65. Chain 70 engages sprockets 68 and 69. A driving member 71 is secured to the ram 16 and is formed with a vertical slot 71a at one side of the chain 70 and slotted ears 72, 73 facing each other and open downwardly and upwardly respectively adjacent the other side of chain 70. Driving pins 74, 75 are fixed to opposite sides of the chain 70 in position to engage respectively the slot 71a and the slotted ears. The arrangement is such that as the chain 70 travels in a clockwise direction as seen in Figs. 1 and 7, the pin 74 remains at all times in the vertical slot 71a and pin 75, in passing about the sprocket 68, engages the notch in the ear 73, and thereafter propels the ram to the left, as seen in Figs. 1 and 7, until the link carrying the pin passes about the sprocket 69, at which point the pin 75 releases the ear 73, and upon further travel of the chain, the pin 74 engages the slot in the ear 72, driving the ram in the reverse direction until the pins 74 and 75 pass about the sprocket 68, at which time it releases the ear 72 and engages the ear 73 as before, thereby providing a reciprocating movement to the ram 16 and through it to the rotating cutter.

For advancing the drum 20 step-by-step between successive cuts, a cam shaft 80 is horizontally journalled in the bracket 12 and has a worm gear 81 and a crank 82 fixed thereto. A shaft 83 arranged horizontally and at right angles to shaft 80 and journalled in the bracket 12 has a worm gear 84 fixed thereto for engagement with the worm 81 and has a sprocket 85 also fixed thereto which is driven by chain 86 from the sprocket 87 fixed to shaft 61 previously mentioned. A ratchet wheel 88 is fixed to shaft 19 to which the drum 20 is secured. The bell crank 89 is pivotally mounted on the shaft 19 and a pawl 89a is pivotally mounted on one arm thereof for engagement with the ratchet wheel, while the other arm thereof is pivotally connected to a connecting rod 90, the lower end of which is pivotally connected to the crank 82. The crank 82 is of the adjustable throw type and by adjustment of its throw, the amount of feed of the ratchet wheel and thereby the drum 20 may be regulated to evenly space the slits in the belts. A brake band 91 frictionally engages a brake drum 92, fixed to shaft 19, and prevents overrunning of the ratchet wheel due to inertia, while a gravity-actuated pawl 93, engaging the ratchet wheel 88, prevents the ratchet wheel from running in a reverse direction.

For lifting the cutter on the return stroke of the ram from contact with the belts, a cam 100 is secured to shaft 80. A bell crank 101 is pivotally mounted as at 102 on bracket 12 and one arm thereof carries a cam roller 103 which engages a groove in the cam while the other arm thereof is pivotally secured, as at 104 to a block 105, the block 105 having an aperture through which a rod 106 passes. The upper end of the rod 106 is pivotally connected as at 107 to a lever 108 pivoted at 109 on the frame member 14, the other end of the lever 108 being pivotally secured to the motor 52 by a link 110. A stop collar 111 is secured to the rod 106 and is separated from the block 105 by a compression coil spring 112. Adjusting nuts 113 are secured to the lower end of the rod 106 and engage the lower side of the block 105. The cam slot of the cam 100 is of such shape and so arranged with relation to the crank 82 that during the advancing rotation of drum 20 by the link 82 and during the reverse movement of the ram 16 the cutter 53 is raised from contact with the belts and is lowered into cutting position before the ram makes its forward movement.

For adjusting the depth of the cut, the carriage 17 is slidably mounted on the column 10 above the bracket 12 and is supported from the bracket 12 by an adjusting screw 120 threaded through an ear 121 of the collar 13 and impinging upon an ear 122 of the carriage 17.

The operation of the apparatus is as follows:

The hand wheel 42 is operated to raise the cradle frame 29, and the endless belts 25, which are to be slit on their inner faces, are reversed upon themselves to present their inner or narrow faces outwardly and are slipped over the drum 20 and the cradle rollers 30. After arranging the belts in spaced relation, as shown, the hand wheel 42 is operated in the opposite direction to lower the cradle frame 29 and tension the belts about the drum 20. The motor 52 is then energized to rotate the circular cutter and a lubricant supply 125 is provided to feed lubricant such as water to the cutter. The motor 55 is then energized and this causes reciprocation of the ram 16 and also raising and lowering of the cutter between cutting strokes. When successive cuts have been made at regular intervals throughout the periphery of the belts, the machine is stopped by de-energizing the motors 52 and 55. This may be accomplished by a counter 126 adapted to operate a stop switch in the motor circuit after a predetermined number of cuts. The tension on the belts is then released and the belts are removed from the machine.

Variations may be made without departing from the scope of the invention as it is defined by the following claims.

I claim:

1. Apparatus for cutting lateral slits in an endless flexible band, said apparatus comprising a rotatable supporting drum, means for tensioning a band about a surface of said drum, means for rotating said drum to advance the band step by step, reciprocating means movable across the face of said drum between movements of the drum for cutting slits in the band, said reciprocating means including a cutter engageable with said band during movement in one direction, and means for lifting said cutter to clear the band during movement in the opposite direction.

2. Apparatus for cutting lateral slits in an endless flexible band, said apparatus comprising a rotatable supporting drum, means for tensioning a band about a surface of said drum, means for rotating said drum to advance the band step by step, reciprocating means movable across the face of said drum between movements of the drum for cutting slits in the band, said reciprocating means including a rotary cutter engageable with said band during movement in one direction, and means for lifting said cutter to clear the band during movement in the opposite direction.

3. Apparatus for simultaneously cutting lateral slits in a plurality of endless belts, said apparatus comprising a drum structure adapted to support a group of the belts in side-by-side relation along the same, means for tensioning the belts about said drum structure, means for rotating said drum structure step-by-step to advance the belts, a cutter moveable in a path across the group of belts in cutting relation therewith, means for advancing said cutter in said path, and means for raising said cutter out of contact with the belts and retracting the same.

4. Apparatus for simultaneously cutting lateral slits in a plurality of endless belts, said apparatus comprising a drum structure adapted to support the belts in side-by-side relation along the same, means for tensioning the belts about said drum structure, means for rotating said drum structure step-by-step to advance the belts, a cutter moveable in a path across the group of belts in cutting relation therewith, means for advancing said cutter in said path, and means for adjusting the relation of said cutter to said drum structure to regulate the depth of cut.

FRANK SLUSHER.